US008627549B2

(12) United States Patent
Vernieu

(10) Patent No.: US 8,627,549 B2
(45) Date of Patent: Jan. 14, 2014

(54) GRIP APPLICATION DEVICE FOR APPLYING A GRIP TO A HANDLE

(76) Inventor: John Vernieu, Wildomar, CA (US)

(*) Notice: Subject to any disclaimer, the term of this patent is extended or adjusted under 35 U.S.C. 154(b) by 305 days.

(21) Appl. No.: 12/878,676

(22) Filed: Sep. 9, 2010

(65) Prior Publication Data

US 2012/0060327 A1   Mar. 15, 2012

(51) Int. Cl.
*B65G 1/10*   (2006.01)
(52) U.S. Cl.
USPC .......................................... 16/421; 74/551.9
(58) Field of Classification Search
USPC ................... 16/421, 430, 110.1; 29/428, 700; 156/85, 349; 74/551.9, 558.5
See application file for complete search history.

(56) References Cited

U.S. PATENT DOCUMENTS

| | | | | |
|---|---|---|---|---|
| 2,132,293 A * | 10/1938 | Hans Harrer | | 30/526 |
| 3,606,326 A | 9/1971 | Sparks et al. | | |
| 3,614,100 A * | 10/1971 | Spitz | | 473/549 |
| 3,848,480 A | 11/1974 | Oseroff et al. | | |
| 4,098,506 A | 7/1978 | Gaiser | | |
| 4,373,718 A | 2/1983 | Schmidt | | |
| 4,398,347 A | 8/1983 | Duffy | | |
| 4,416,166 A * | 11/1983 | Jannard et al. | | 74/551.9 |
| 4,471,209 A * | 9/1984 | Hollander | | 219/204 |
| 4,537,400 A | 8/1985 | Adam | | |
| 4,677,872 A * | 7/1987 | Nishida et al. | | 74/551.9 |
| 4,723,582 A | 2/1988 | Caspall | | |
| 4,785,495 A * | 11/1988 | Dellis | | 16/421 |
| 4,890,355 A | 1/1990 | Schulten | | |
| 4,934,024 A * | 6/1990 | Sexton, I | | 16/421 |
| 4,941,232 A | 7/1990 | Decker et al. | | |
| 4,981,737 A | 1/1991 | Rico | | |
| 5,000,452 A | 3/1991 | Kuebler | | |
| 5,042,804 A | 8/1991 | Uke et al. | | |
| 5,155,878 A * | 10/1992 | Dellis | | 16/421 |
| 5,348,360 A * | 9/1994 | Mencarelli et al. | | 294/57 |

(Continued)

FOREIGN PATENT DOCUMENTS

| | | |
|---|---|---|
| EP | 0693322 A2 | 1/1996 |
| GB | 2323296 A | 9/1998 |

(Continued)

OTHER PUBLICATIONS

Website: http://www.amazon.co.uk/UPFRONT-cricket-cone-rubber-applicator/dp/B000VDDUDK/ Downloaded Nov. 20, 2009 UPFRONT cricket bat cone rubber grip applicator and UPFRONT grips.

(Continued)

*Primary Examiner* — William Miller
(74) *Attorney, Agent, or Firm* — Russ Weinzimmer & Associates P.C.

(57) ABSTRACT

Methods of improving a handle grip are disclosed that provide a simple, economical, way to improve a grip on a handle. An improved grip can be placed on a handle by first providing a grip for placement on the handle. The grip can include an outer grip formed of an elastic material in a radially extended state, the outer grip configured to provide a secure and comfortable hold on the handle for a user, and an inner tube holding the elastic material in the extended state. The inner tube can be removable to allow the outer grip to constrict radially. The grip can then be placed over the handle, and the inner tube removed, allowing the outer grip to constrict radially to conform in fixed attachment to the handle.

11 Claims, 5 Drawing Sheets

(56) References Cited

U.S. PATENT DOCUMENTS

| | | |
|---|---|---|
| 5,364,677 A | 11/1994 | Sendziak |
| 5,492,425 A | 2/1996 | Carter et al. |
| 5,584,482 A | 12/1996 | Huang |
| 5,588,343 A | 12/1996 | Rust et al. |
| 5,785,607 A | 7/1998 | Huang |
| D403,943 S | 1/1999 | Curry |
| 5,865,945 A | 2/1999 | McConaughy |
| 5,926,911 A | 7/1999 | Chen |
| 6,048,612 A | 4/2000 | Dozier |
| 6,092,442 A | 7/2000 | Macor |
| 6,174,244 B1 * | 1/2001 | Zimmerman ............ 473/203 |
| 6,247,385 B1 | 6/2001 | Wu |
| 6,308,761 B1 | 10/2001 | Latiri |
| 6,449,803 B1 | 9/2002 | McConchie |
| 6,685,372 B1 | 2/2004 | Foss et al. |
| 6,779,937 B1 | 8/2004 | Lombardi et al. |
| 7,008,339 B2 | 3/2006 | Sutherland |
| D531,479 S | 11/2006 | Davis |
| 7,219,395 B2 * | 5/2007 | Bigolin ............ 16/421 |
| 7,805,812 B2 * | 10/2010 | Ohishi et al. ............ 16/421 |
| 8,006,349 B2 * | 8/2011 | Gill ............ 16/421 |
| 2002/0107088 A1 | 8/2002 | Lamkin et al. |
| 2008/0230561 A1 | 9/2008 | Mark |
| 2009/0003917 A1 | 1/2009 | Duncan |
| 2009/0048036 A1 | 2/2009 | Huang |

FOREIGN PATENT DOCUMENTS

| | | |
|---|---|---|
| JP | 08197883 A2 | 8/1996 |
| JP | 10193867 A2 | 7/1998 |
| JP | 2003335091 A2 | 11/2003 |
| JP | 2006223632 A2 | 8/2006 |
| NL | 1022651 C2 | 8/2004 |
| WO | 9601699 A1 | 1/1996 |
| WO | 0015310 A1 | 3/2000 |
| WO | 2008115466 A2 | 9/2008 |

OTHER PUBLICATIONS

Website: http://www.amazon.co.uk/Gunn-Moore-Vacuum-Grip-Applicator/dp/B000ZNW7P8/ref=pd_cp_sg_2 Downloaded Nov. 20, 2009 Gunn and Moore Vacuum Grip Applicator.

Website: http://stason.org/TULARC/sports/cricket/62-How-do-I-put-the-grip-on-the-bat.html Downloaded Nov. 20, 2009 Advice for applying grip to a bat.

* cited by examiner

GRIP APPLICATION DEVICE FOR APPLYING A GRIP TO A HANDLE

FIELD

This application relates generally to management of handles, and particularly to improving the grip on handles.

BACKGROUND

Handles for tools and other objects allow humans to perform many tasks with ease and convenience. Virtually every personal tool includes a handle so a person can grip the tool and guide it in its use. Handles are formed in a variety of configurations depending on the tool and also with ergonomic considerations in mind. Many handles are generally cylindrical in shape to accommodate a person's hand grasping the handle. The portion of the handle to be grasped is generally referred to as a "grip." Some handles have a coating or outer shape formed over a core to provide an improved grip over a bare handle or core. Other handles do not have additional materials covering the handle at the grip.

Many useful tools come with soft grips. Grips formed of soft material for comfort tend to fail before the tool breaks, is worn-out, or otherwise loses its usefulness. Some grips are formed of a harder material to be more durable than soft material grips, but those grips generally sacrifice comfort for durability. Replacement and supplementary grips are uncommon because handles come in many different shapes and sizes, and because replacing a handle is generally a difficult process. What replacement grips that are available tend to be very specific to a particular handle and application, such as replacement grips for golf clubs and tennis rackets, which are usually replaced by professionals and not by the owners of these items because of the difficulty and expertise required in replacing the grips.

SUMMARY

Methods of improving a handle grip are disclosed that provide a simple, economical, way to improve a grip on a handle. An improved grip can be placed on a handle by first providing a grip for placement on the handle. The grip can include an outer grip formed of an elastic material in a radially extended state, the outer grip configured to provide a secure and comfortable hold on the handle for a user, and an inner tube holding the elastic material in the extended state. The inner tube can be removable to allow the outer grip to constrict radially. The grip can then be placed over the handle, and the inner tube removed, allowing the outer grip to constrict radially to conform in fixed attachment to the handle.

The outer grip can include one or more enhanced gripping features, such as bumps, dimples, ridges, and grooves. The grip can also include an adhesive layer between the outer grip and the inner tube to provide for the fixed attachment between the outer grip and the handle. The grip can include a pliable layer between the outer grip and the inner tube. The pliable layer may be the adhesive layer and be formed from a mastic material.

The inner tube can be formed from a helically would flexible strip forming adjacent coils with a tail extending from one end of the inner tube. Removing the inner tube can be performed by pulling the tail of the flexible strip through the inner tube until the entire inner tube is removed from inside of the outer grip. A release agent can be applied to the inner tube between the inner tube and the outer grip to prevent the adhesive layer from sticking to the inner tube.

BRIEF DESCRIPTION OF THE DRAWINGS

The following description can be better understood in light of Figures, in which.

Figure 1:
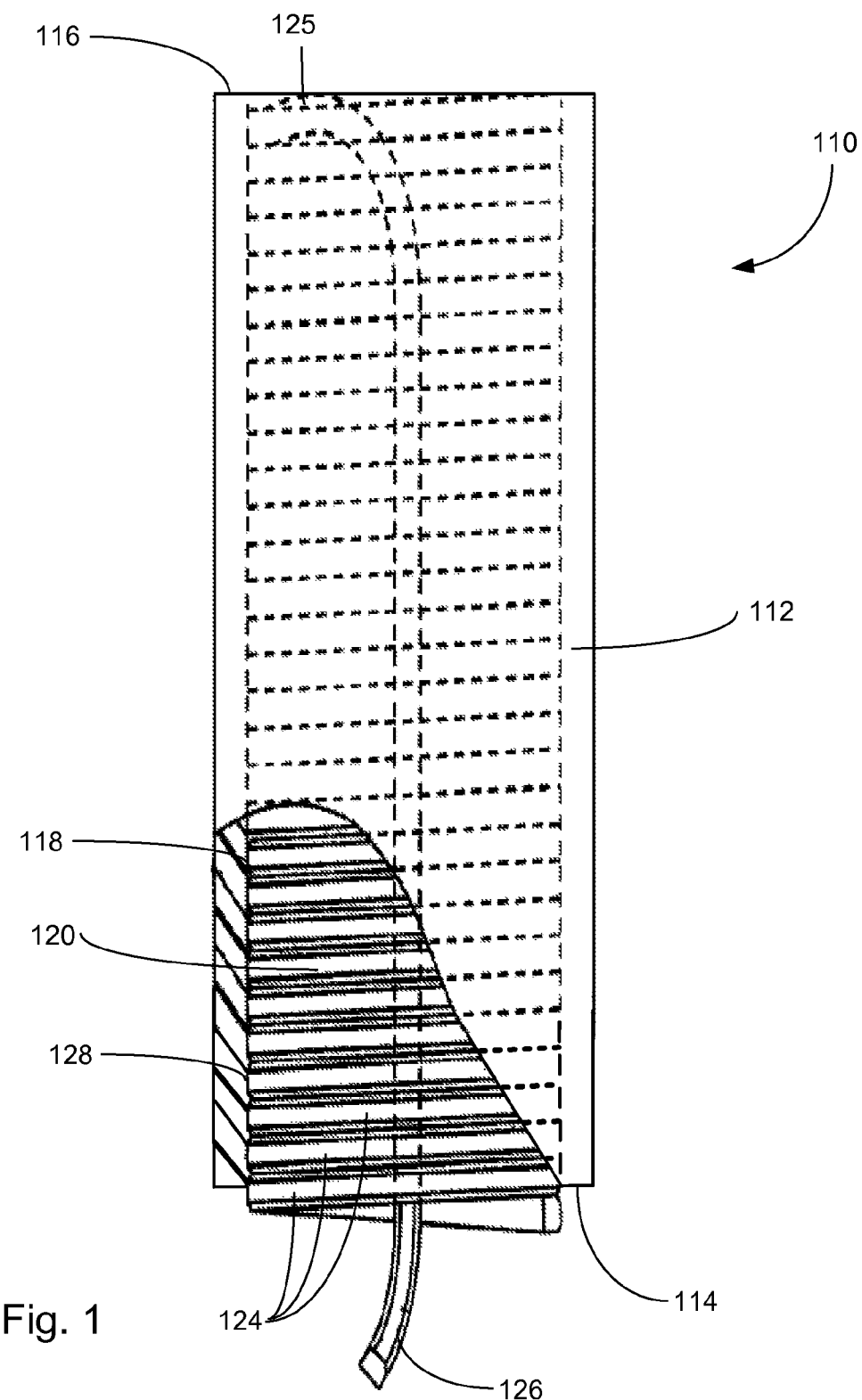
FIG. 1 is a drawing of an exemplary grip in an extended configuration.
Figure 2:
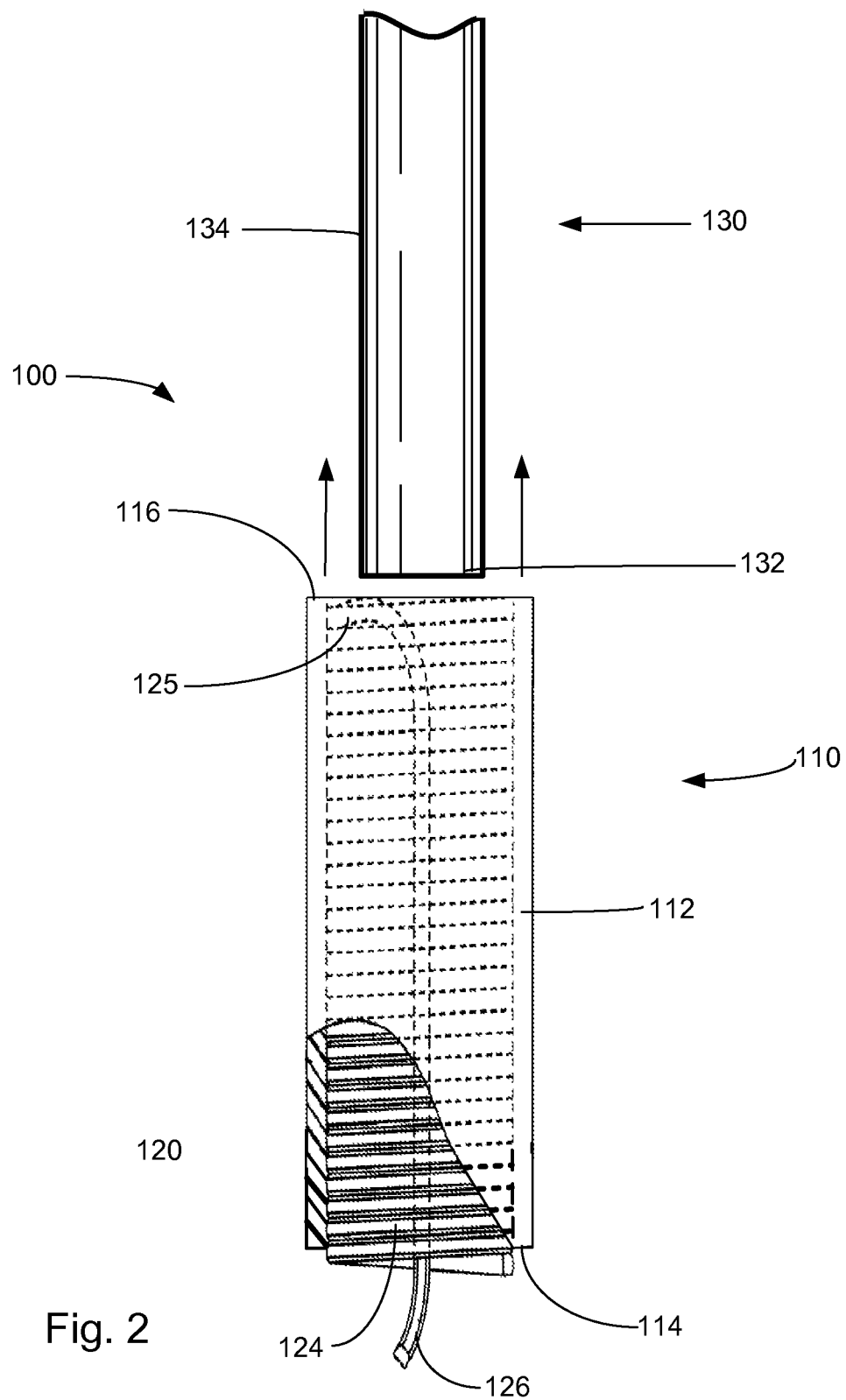
FIG. 2 is a drawing of the grip of FIG. 1 being applied to a handle.

Together with the following description, the Figures demonstrate and explain the principles of methods for placing a grip on a handle. In the Figures, the size, number and configuration of components may be exaggerated for clarity. The same reference numerals in different Figures represent the same component.

DETAILED DESCRIPTION

The following description supplies specific details in order to provide a thorough understanding. Nevertheless, the skilled artisan would understand that embodiments of methods for placing grips on handles can be implemented and used without employing these specific details. Indeed, exemplary embodiments and associated methods can be placed into practice by modifying the illustrated units and associated methods and can be used in conjunction with any other devices and techniques conventionally used in the industry. For example, while the description below generally focuses on a grip being placed on a straight, generally cylindrical handle, such as is found on a hammer or garden tool, the method could be equally applied with other handles with various cross-sectional shapes, curvatures, and other features. For example, a handle can be any object formed to be gripped by a hand, such as a handgrip or handle portion on a switch, lever for tractor, lever for military equipment, or any other type of lever, or any other protrusion made to be gripped by a hand.

One exemplary method of placing a grip on a handle is illustrated in FIGS. 1-4. FIG. 1 illustrates grip 110 with outer grip 112 and inner tube 120. Outer grip 112 may be formed form elastomeric or other elastic material that can be extended, held in the extended state for a long period of time, and then returned to a non-extended state. Outer grip 112 may be held in an extended state by inner tube 120. Outer grip 112 may be shock-resistant, shock absorbent, or otherwise pliant to provide a comfortable grip to a user. Outer grip 112 may similarly be formed from a material that provides a relatively high coefficient of friction for a hand to provide a secure grip when held by a user. For example, outer grip may be formed from closed-cell neoprene foam material, rubber or rubber compound, elastomeric polymers, or any other suitable material. Depending on the material used and the desired grip, softness, and shock-absorbency, outer grip 112 can have an unstretched thickness between a few thousands of an inch to a quarter inch or more.

Outer grip 112 can include adhesive coating 118 applied to the inner surface of outer grip 112 during the manufacturing process of grip 110. Adhesive coating 118 may be any material that provides adhesion between outer grip 112 and outer surface 134 of handle 130. For example, in some embodiments adhesive coating 118 can be a pliable layer formed from a mastic material that provides comfort and shock absorbency, along with adhesion. In such embodiments, outer grip 112 may be formed of a more durable material because adhesive layer 118 can provide comfort features of softer materials.

In some embodiments, a spray adhesive may be applied to outer surface 134 of handle 130 prior to application of outer grip 112, as described below in further detail. Similarly, in some embodiments, the inherent friction and compression of outer grip 112 against handle 130 when applied can be sufficient to prevent outer grip 112 from sliding off of handle 130 that no adhesive is required.

Inner tube 120 may be formed as a hollow tube from consecutive and adjoining coils 124 formed from a continuous flexible strip of wire-like material wound helically to form a tube. Inner tube 120 may be formed from plastic, metal, or any other material suitable for coiling and uncoiling as described below. In some embodiments, coils 124 are attached together when formed, but easily separate when pulled apart, as described below Inner tube 120 can include release tail 126 extending through the center of inner tube 120 and becoming top coil 125. Tail 126 can originate at top coil 125 near top edge 116 of outer grip 112. Tail 126 can then extend through the center of inner tube 120 and extend out of the bottom of inner tube 120 near bottom edge 114 of outer grip 112.

Inner tube 120 can include release layer 128 applied to the outer surface of inner tube 120 to keep adhesive layer 118 from adhering to inner tube 120. In some embodiments, a release layer 128 may not be required either because no adhesive layer 118 is applied to outer grip 112, because inner tube 120 is formed from a material that is not easily adhered to, or because adhesive layer 118 is formed from an adhesive that is neither itself damaged, nor does it cause damage to, outer grip 112 when each of coils 124 is removed from their contact with adhesive layer 118.

Handle 130 can be any handle having an end 132 that can be placed within inner tube 120. For example, handle 130 can be part of a hand-tool handle, such as a shovel or hammer handle, a door handle, or any other handle of any implement gripped by a person and that can be placed inside of inner tube 120. In the Figures, handle 130 is a straight, generally cylindrical handle. However, handle 130 may have any cross-section, shape, curvature, etc. of any type of handle formed to be gripped by a person.

Figure 3:
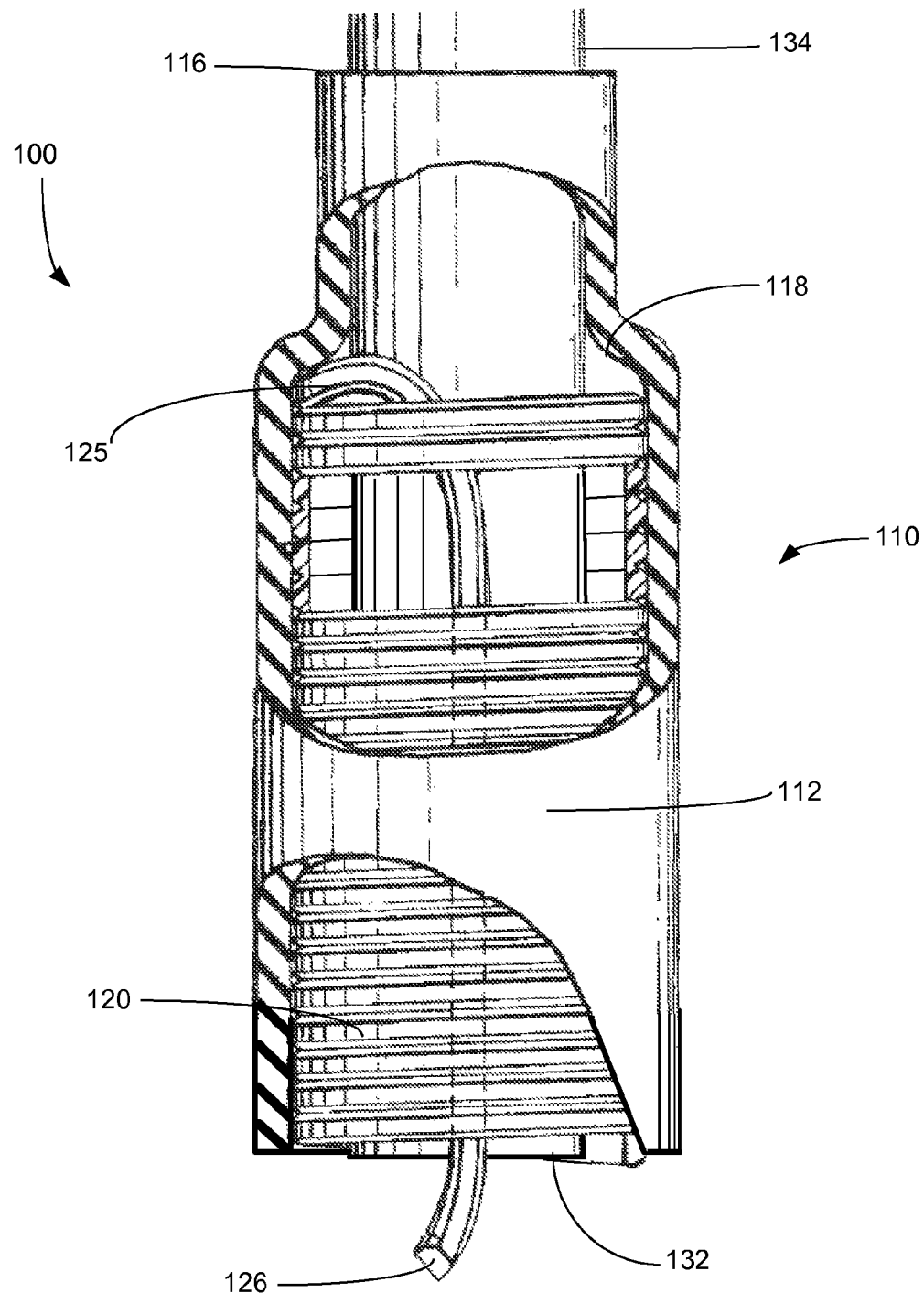
FIG. 3 is a drawing of the grip of FIG. 1 being applied to a handle.
Figure 4:
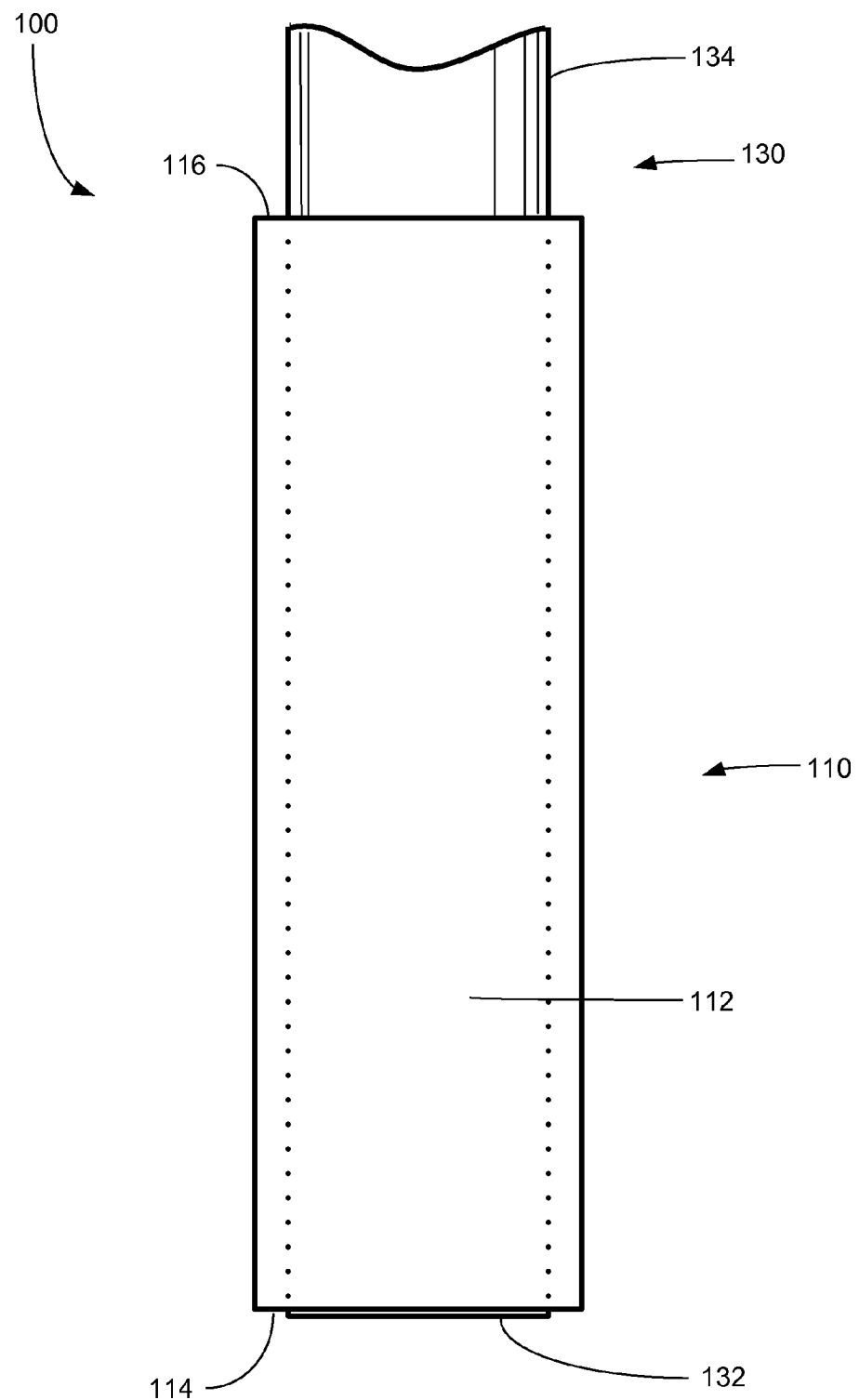
FIG. 4 is a drawing of the grip of FIG. 1 on a handle.

To apply grip 110 to handle 130 to form gripped item 100, end 132 of handle 130 can be inserted into the center of grip 110 past top edge 116 and extending through the center towards or passing bottom edge 114. Once handle 130 is within inner tube 120 and grip 110 is positioned in the desired location on handle 130, tail 126 can be pulled, which releases top coil 125, allowing outer grip 112 to conform to outer surface 134 of handle 130 from top edge 116 towards bottom edge 114, as best illustrated in FIG. 3. As tail 126 is pulled, tail 126 releases each coil 124 successively until all of inner tube 120 is removed from contact with outer grip 112. Once inner tube 120 in completely removed, outer grip 120 is constricted around outer surface 134 of handle 130, providing a new grip to handle 130 and forming gripped item 100. Once in contact with outer surface 134 of handle 130, adhesive 118 can prevent outer grip 112 from being pulled off of handle 130. In some embodiments, outer grip 112 may be placed over an existing grip, or an existing grip on handle 130 may be removed prior to placing outer grip 112.

Figure 5A:
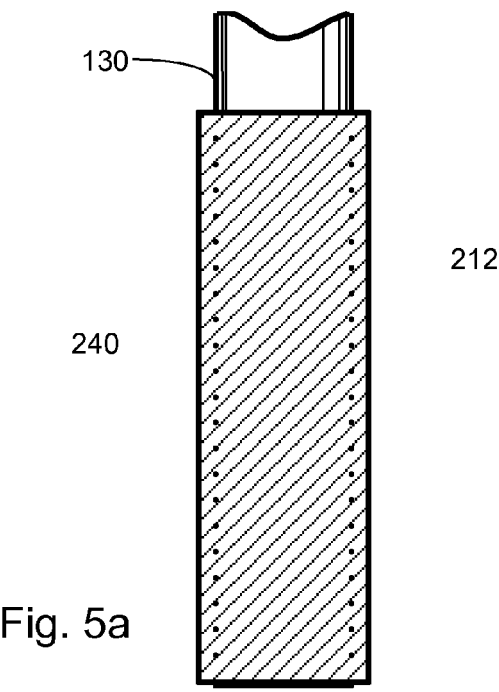
FIGS. 5a-5d illustrate various gripping features of exemplary grips.
Figure 5B:
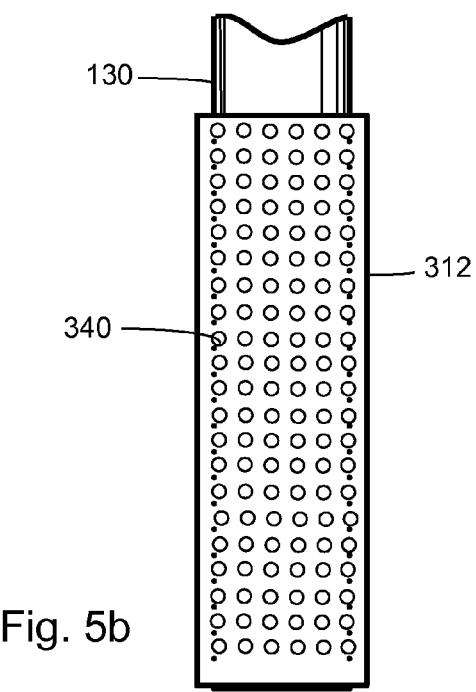
Figure 5C:
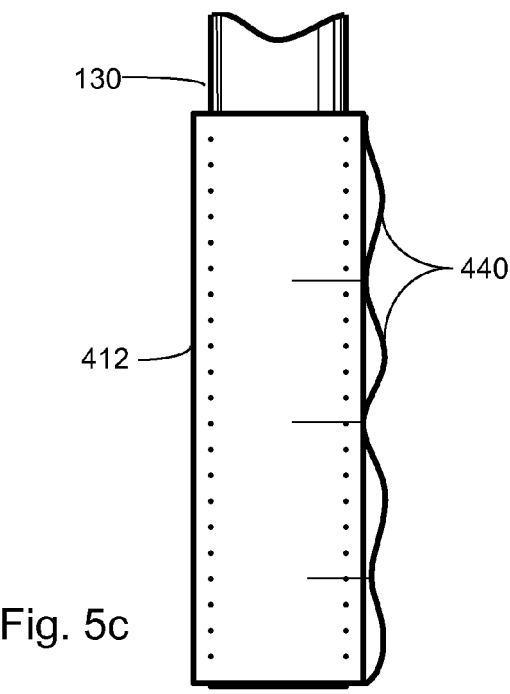
Figure 5D:
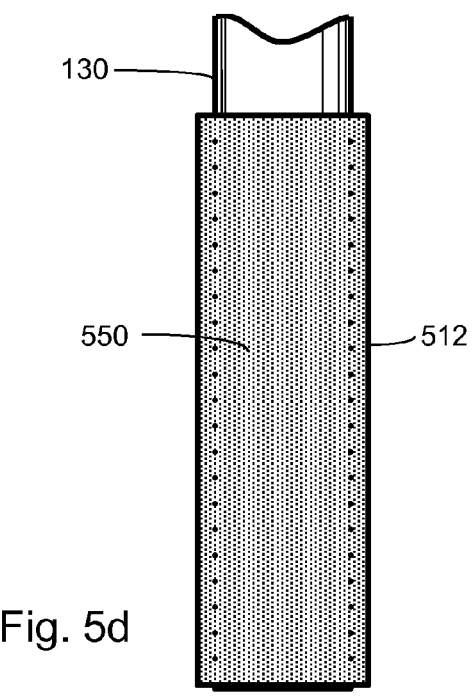

In some embodiments, outer grip 112 may include gripping features such as bumps, dimples, ridges, grooves, textures, or other surface features that provide enhanced ergonomic, gripping, or aesthetic qualities to gripped item 100. For example, grooves 240 may be formed in outer grip 212, as shown in FIG. 5a, bumps or dimples 340 in outer grip 312 of FIG. 5b, ridges 440 in outer grip 412 of FIG. 5c, texture 540 in outer grip 512 of FIG. 5d, or any other desirable gripping features.

In addition to any previously indicated modification, numerous other variations and alternative arrangements can be devised by those skilled in the art without departing from the spirit and scope of this description, and appended claims are intended to cover such modifications and arrangements. Thus, while the information has been described above with particularity and detail in connection with what is presently deemed to be the most practical and preferred aspects, it will be apparent to those of ordinary skill in the art that numerous modifications, including, but not limited to, form, function, manner of operation and use can be made without departing from the principles and concepts set forth herein. Also, as used herein, examples are meant to be illustrative only and should not be construed to be limiting in any manner.

The invention claimed is:

1. A grip application device for applying a grip to a handle, the grip application device comprising:
   an outer grip formed of a resilient elastic material, the outer grip configured to provide a secure and comfortable hold on the handle for a user; and
   an inner tube located concentrically within the outer grip, wherein:
      the inner tube is configured to have sufficient structural rigidity to hold the elastic material of the outer grip in an extended state so that the handle can be inserted within both the inner tube and the outer grip,
      the inner tube including a release tail that extends through at least a portion of the inner tube so that the release tail is accessible outside the grip application device when the handle is inserted within the inner tube and the outer grip, and
      the inner tube configured to be removed from the grip application device by pulling the release tail when the handle is inserted inside of the grip application device until the entire inner tube is removed,
      whereby the outer grip is allowed to return to a non-extended state as the inner tube is removed, so that the outer grip is adapted to forcefully constrict radially around the handle and to thereby conform to the handle as a fixed attachment.

2. The grip application device of claim 1, wherein the outer grip includes one or more enhanced gripping features.

3. The grip application device of claim 2, wherein the one or more enhanced gripping features are selected from:
   bumps;
   dimples;
   ridges; and
   grooves.

4. The grip application device of claim 1, further comprising an adhesive layer between the outer grip and the inner tube, the adhesive layer configured to adhere the outer grip to the handle, the inner tube configured with a material that does not substantially adhere to the adhesive layer to facilitate its removal without damaging the adhesive layer and the outer grip.

5. The grip application device of claim 1, further comprising a pliable layer between the outer grip and the inner tube, the pliable layer being shock absorbent.

6. The grip application device of claim 5, wherein the pliable layer is formed from a mastic material.

7. The grip application device of claim 6, wherein the mastic material is configured to provide adhesion between the outer grip and the handle.

8. The grip application device of claim 1, wherein the inner tube is formed from a continuous flexible filament helically wound to form adjacent coils.

9. The grip application device of claim 8, wherein the release tail is an unwound portion of the flexible filament that extends from a top coil of the adjacent coils.

10. The grip application device of claim 9, wherein the inner tube is removed after the grip application device is placed over the handle, by pulling the tail with sufficient force to uncoil the filament from around the handle starting at the top coil.

11. The grip application device of claim 10, wherein the adjacent coils are formed weakly attached to one another so that the adjacent coils are easily pulled apart from one another to facilitate removal of the inner tube.

* * * * *